United States Patent
Trujillo Gonzalez et al.

(10) Patent No.: US 9,769,657 B2
(45) Date of Patent: Sep. 19, 2017

(54) METHOD AND SYSTEM FOR THE REMOTE PROVISIONING OF SUBSCRIPTION

(75) Inventors: Gloria Trujillo Gonzalez, Madrid (ES); Esther Martinez Sanz, Madrid (ES); Luis Lopez Rizaldos, Madrid (ES)

(73) Assignee: VALID SOLUCIONES TECNOLOGICAS, S.A.U., Madrid (ES)

( * ) Notice: Subject to any disclaimer, the term of this patent is extended or adjusted under 35 U.S.C. 154(b) by 345 days.

(21) Appl. No.: 14/009,591

(22) PCT Filed: Mar. 27, 2012

(86) PCT No.: PCT/ES2012/070204
§ 371 (c)(1),
(2), (4) Date: Oct. 18, 2013

(87) PCT Pub. No.: WO2012/136867
PCT Pub. Date: Oct. 11, 2012

(65) Prior Publication Data
US 2014/0101449 A1    Apr. 10, 2014

(30) Foreign Application Priority Data
Apr. 5, 2011 (EP) .................................. 11161100

(51) Int. Cl.
*H04L 29/00*    (2006.01)
*H04W 12/06*    (2009.01)
(Continued)

(52) U.S. Cl.
CPC .......... *H04W 12/06* (2013.01); *H04W 8/183* (2013.01); *H04W 12/04* (2013.01); *H04L 63/062* (2013.01); *H04W 8/265* (2013.01)

(58) Field of Classification Search
CPC ................................ H04L 29/06; H04M 1/66
(Continued)

(56) References Cited

U.S. PATENT DOCUMENTS

2008/0260149 A1   10/2008   Gehrmann
2009/0239503 A1*  9/2009    Smeets .......................... 455/411
(Continued)

OTHER PUBLICATIONS

International Search Report dated Aug. 8, 2012 issued in corresponding International patent application No. PCT/ES2012/070204.
(Continued)

*Primary Examiner* — Brandon Hoffman
*Assistant Examiner* — Michael D Anderson
(74) *Attorney, Agent, or Firm* — Ostrolenk Faber LLP

(57) ABSTRACT

The present disclosure relates to a method and system for the remote provisioning of an access subscription of a user to a wireless communication network, wherein at least one network operator provides communication services to mobile communication devices provided with a user UICC card. Data of a temporary subscription are generated from the data of an initial subscription which will subsequently allow generating data of a definitive subscription in a network operator and in the UICC card requesting a subscription from the former without the need of remotely transmitting sensitive data of the definitive subscription.

16 Claims, 9 Drawing Sheets

(51) Int. Cl.
*H04W 8/18* (2009.01)
*H04W 12/04* (2009.01)
*H04L 29/06* (2006.01)
*H04W 8/26* (2009.01)

(58) Field of Classification Search
USPC .......................................... 713/156; 455/411
See application file for complete search history.

(56) References Cited

U.S. PATENT DOCUMENTS

2010/0106967 A1    4/2010  Johansson et al.
2011/0161659 A1*  6/2011  Himawan et al. ............ 713/156

OTHER PUBLICATIONS

International Search Report Written Opinion dated Aug. 8, 2012 issued in corresponding International patent application No. PCT/ES2012/070204.

* cited by examiner

METHOD AND SYSTEM FOR THE REMOTE PROVISIONING OF SUBSCRIPTION

CROSS REFERENCE TO RELATED APPLICATIONS

The present application is a 35 U.S.C. §371 National Phase conversion of PCT/ES2012/070204, filed Mar. 27, 2012, which claims the benefit of European application no. 11161100.0, filed Apr. 5, 2011 the disclosure of which is incorporated herein by reference. The PCT application was published in the Spanish language.

TECHNICAL FIELD OF THE INVENTION

The object of the present invention is a method and system for the remote provisioning of an access subscription of a user to a wireless communication network improving the security and efficiency in a new subscription provisioning process.

BACKGROUND OF THE INVENTION

Mobile network operators offer connectivity services to their customers using a smart card as a secure element allowing authentication in their networks. The smart card is introduced in the communication device, the most common communication device being mobile handsets.

User authentication in the network of the mobile operator occurs by means of using the smart card contained in the handset after activating the mobile.

Said smart card contains NAA (Network Access Application) applications which in turn contain the algorithms and keys required for authenticating a specific user subscribing to the services offered by a specific operator in a specific country.

The NAA applications can be SIM applications, USIM applications, ISIM applications, etc.
  SIM applications allow access to GSM or 2G networks.
  USIM applications allow access to GSM or 2G, UMTS or 3G and LTE or 4G networks.
  ISIM applications allow access to virtual IMS networks offering operator services over IP such as for example VoIP (voice over IP) or SMSoIP (SMS over IP).

Authentication mechanisms may vary depending on the NAA application and on the type of network. Furthermore each operator can define the type of algorithm to use for authentication in its network.

Authentication processes follow the standards defined in ETSI and 3GPP organizations. These standards define the data which must be stored in the smart card as well as the processes and algorithms which must be supported. The type of algorithm used can be of the operator's choice.

There is another case of use consisting of connecting devices using mobile networks to allow data exchange. This interconnection would allow connecting any device without the need of having a fixed communications infrastructure.

This interconnection allows offering services such as:
  vehicle tracking (emergencies, fleet management).
  monitoring (meters of services such as gas, water, etc.; object, animal or human protection).
  transaction processing (sales terminal).
  control (vending machines, production management and machinery breakdowns).

The following elements are necessary for interconnecting the devices:
  Smart card:
    Contains the required NAA application.
    Authentication data.
    Authentication keys.
    Authentication algorithms
  Mobile network accessing device, commonly known as modem, containing the smart card for authentication in the network.
  Connected device. This device contains the mobile network accessing device which allows it to connect and interact with other devices or systems.
  Application contained in the device which allows offering the desired service. This application can be included in the connected device, in the smart card itself or in both.

The smart card can contain means so that it is not possible to use said card to provide access to the operator network outside the environment in which it is provisioned:
  Smart card—connected device pairing mechanism
  Physical format of the smart card making it non removable. It can, for example, be welded as part of the electronics of the connected device.

Several actors involved in the device interconnection service can be defined.
  Manufacturer of the device susceptible to being connected.
  Smart card manufacturer.
  Mobile network operator.
  User owner of the connected device.

The manufacturer of the device has to include a smart card therein.

This smart card must contain the data, keys and algorithms (defining a subscription) allowing the device to connect to a mobile network.

The user owner of the device is also the owner of the subscription of the mobile network operator.

After the process of manufacturing the device, it is already linked to a specific subscription limiting:
  The network operator to be used
  The country where the interconnection service is to be provided because although an operator can be present in several countries each subscription is only valid in a specific country. It could be used in other countries, but it would be with roaming which would make the service more expensive.

To solve this problem there are many solutions which allow changing the subscription remotely.

One drawback is that the device has to be issued with a temporary subscription which allows a first remote access to be able to be changed for another subscription desired by the end user. To solve this problem there are solutions defining an official organization which is the one providing the pre-provisioning service and allowing the user to change to the final network operator.

Other solutions allow agreements between network operators which will manage the transition from one operator to another by means of remote provisioning of a subscription of the new operator.

One of the greatest problems in terms of changing subscription is the remote transmission of sensitive parameters such as keys. Although there are security mechanisms for these transmissions, even by using asymmetric cryptology (RSA), due to cost devices of this type use symmetric algorithm-based security which may be vulnerable.

To solve this the device can be pre-provisioned with several subscriptions and then simply select the desired one remotely. Therefore the keys would never be sent remotely. In contrast n subscriptions, most of which would finally be discarded, must be managed and reserved by each operator at the time of manufacturing the device. Furthermore the use of another subscription which was not pre-provisioned would not be allowed.

This point can be solved if the keys of all the subscriptions were shared. But this would imply that the different network operators must know the keys.

SUMMARY OF THE INVENTION

One aspect of the present invention relates to a method for the remote provisioning of an access subscription of a user to a wireless communication network, where at least one network operator provides communication services to mobile communication devices incorporating a user UICC (Universal Integrated Circuit Card) card, where said UICC contains data defining an initial subscription, said data comprising initial keys keys 1.

This method comprises sending a subscription provisioning request to a network operator, sending the initial keys keys 1 forming part of said initial subscription to said network operator, and generating data of a new subscription in the network operator, which are sent, at least in part, to the UICC requiring the provisioning.

The definitive keys of a definitive subscription are generated from the data of the new temporary subscription which has been sent to the UICC both in the network operator and the UICC. Said definitive subscription is valid for the access of the UICC to the services provided by the network operator.

One of the technical advantages of the present invention is that it provides a remote provisioning mechanism in which there is only an initial subscription and allows providing new temporary subscriptions: without the data of the new temporary subscriptions being contained in the UICC (Universal Integrated Circuit Card), without the need of sending sensitive objects remotely and without the requirement of sharing sensitive objects between the different entities.

Another technical advantage of the present invention is that temporary subscriptions sharing keys of the previous subscription and allowing the generation of definitive keys in both points (operator network and UICC) without the need of transmitting the definitive keys, are provided.

The invention also relates to a system in which the method defined above is implemented, at least one UICC card and a wireless communication network forming part of said system.

DESCRIPTION OF PREFERRED EMBODIMENTS

Figure 1:
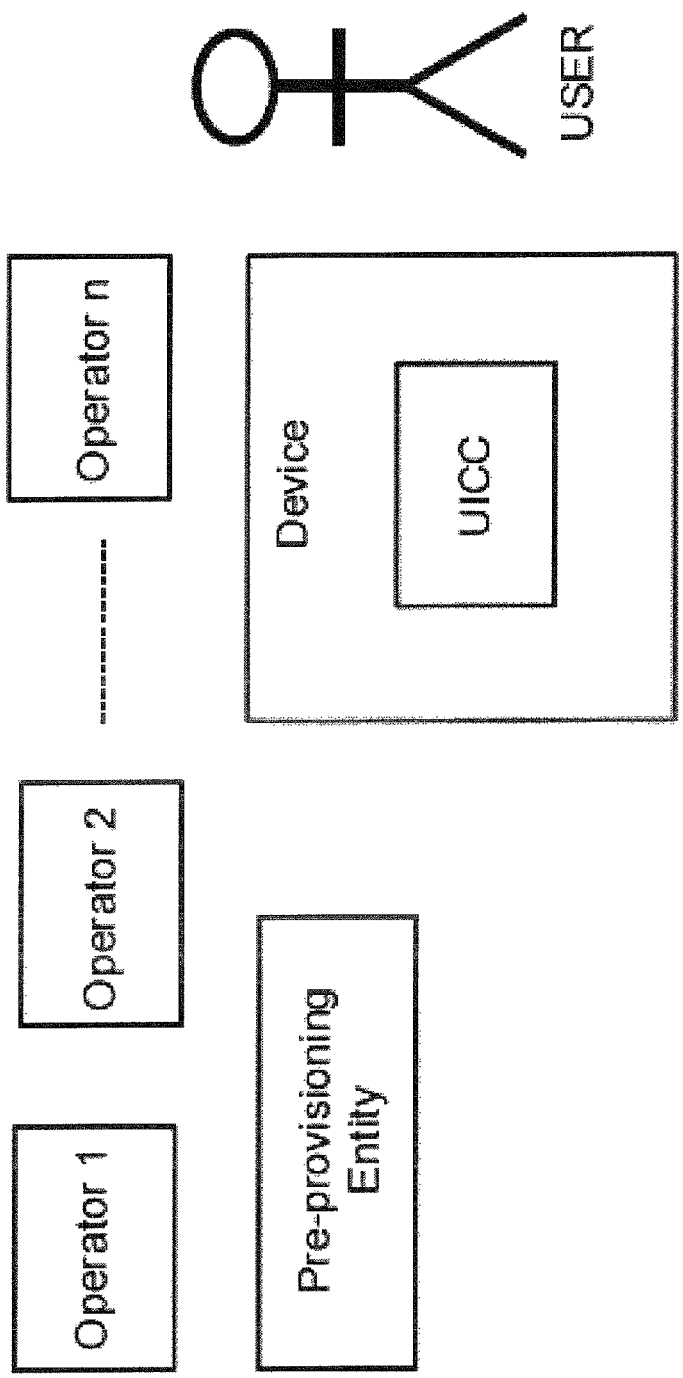
FIG. 1 shows a diagram of the entities involved in the subscription provisioning process.

FIG. 1 shows the entities involved in the method and system of the invention:

The entities involved are the network operators the subscriptions of which are susceptible to being provisioned.

The pre-provisioning entity is the entity owning the initial subscription. It is possible that this entity is a network operator, a public organization or any entity which is not intended to be the final network service provider.

The connected device.

The smart card (UICC) included in the connected device.

The user owner of the connected device.

Figure 2:
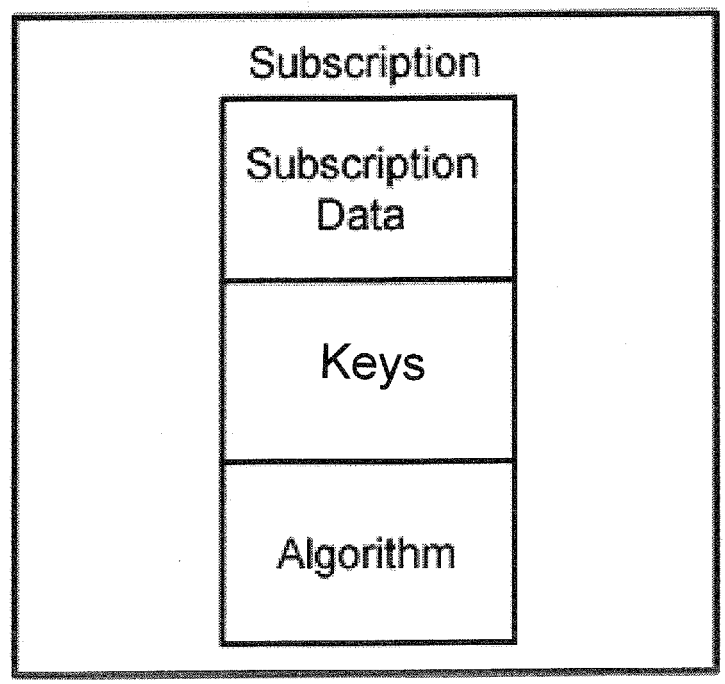
FIG. 2 shows a diagram of the data and elements defining a subscription.

Subscription: FIG. 2

A subscription is defined by:

Subscription data of the operator: it includes all the parameters the operator wants to be included in the UICC and which allows the operator to offer the desired services. Some data can be used in authentication process.

Keys: Used for authentication process and for providing security to services offered by the network operator.

Algorithms: Algorithms used in the authentication process.

Figure 3:
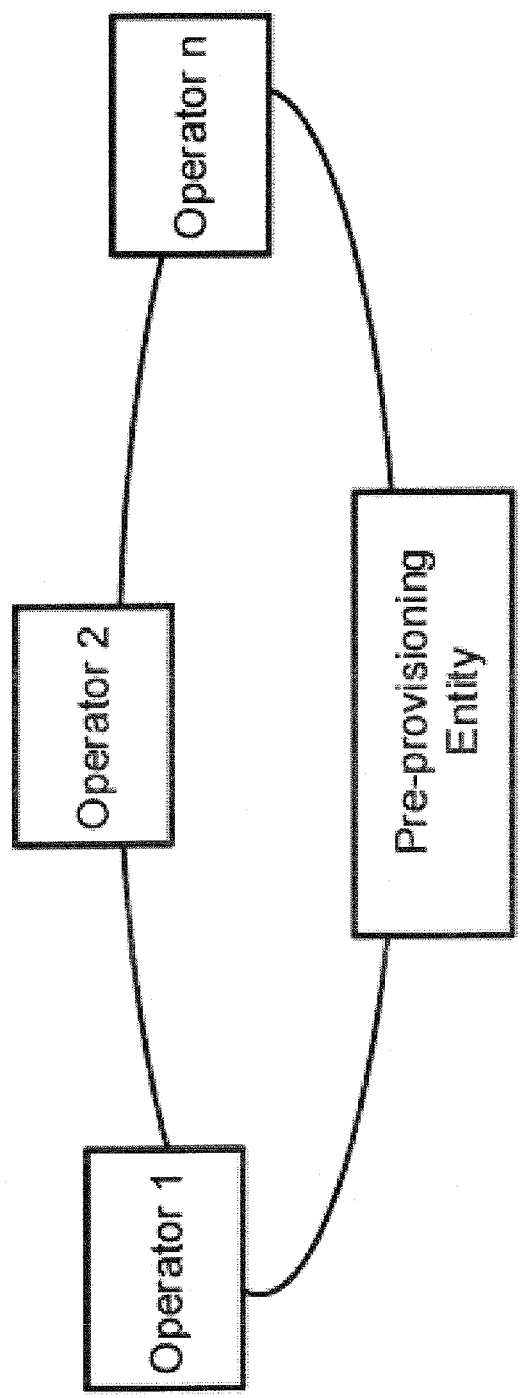
FIG. 3 shows a diagram of data connections and communications established between some of the entities of the process.

Data connections—communications FIG. 3

The operators can communicate with one another through secure networks or other mechanisms which allow transferring sensitive data between them.

The pre-provisioning entity can also communicate with one another using the same means.

In the case of the present invention the operators could transfer the temporary keys using these data connections.

Figure 4:
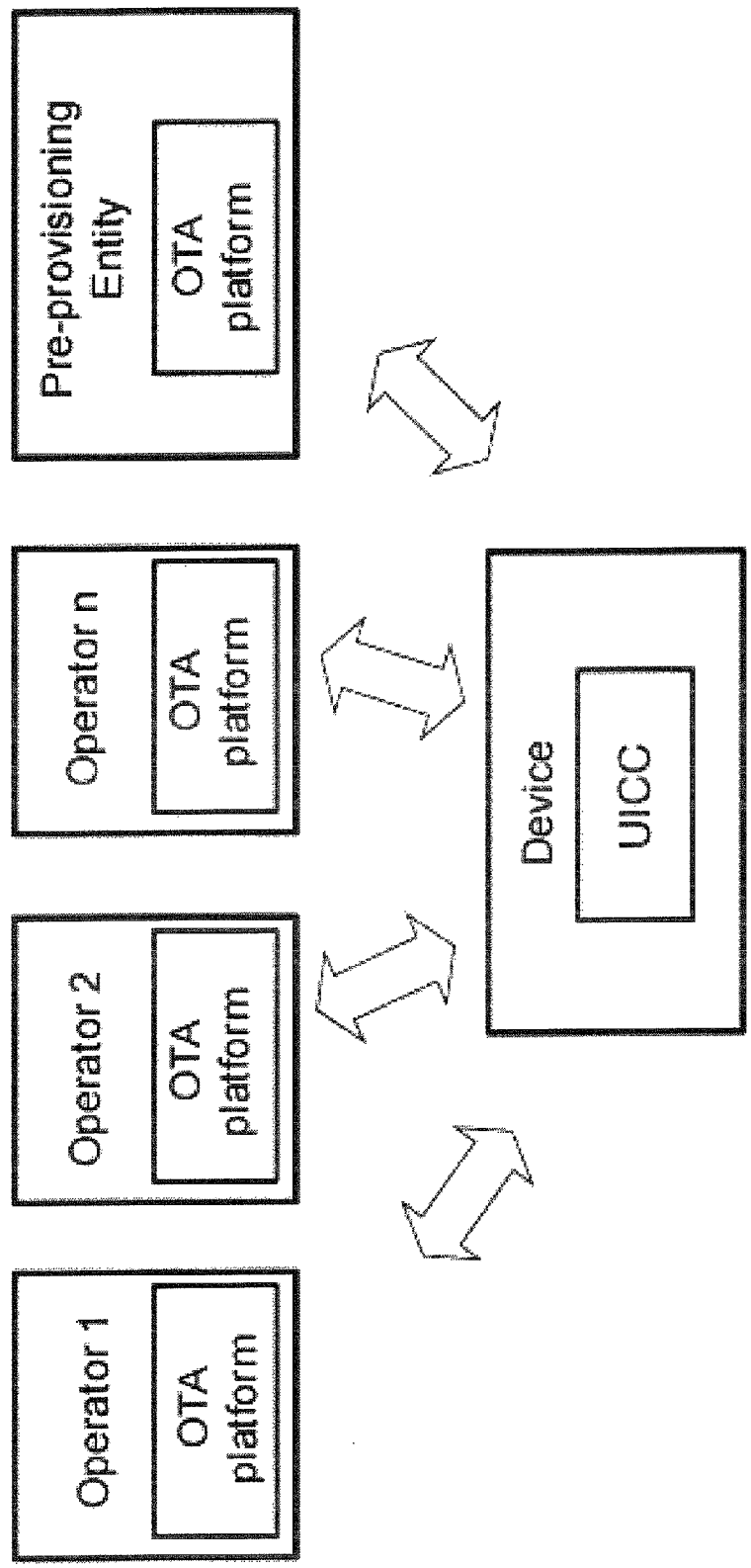
FIG. 4 shows a diagram of remote data connections and communications established between some of the entities of the process.

Remote data connections communications FIG. 4

These remote communications allow the network operators and the pre-provisioning entity to communicate with the UICC located in the remote device.

To perform this communication each entity has its own OTA (Over The Air) platform.

An OTA platform allows the network operator to which the subscription belongs to manage a UICC. Among the different communication protocols supported are secure SMS, CAT_TP or in the future HTTPS over IP connections.

Figure 5:
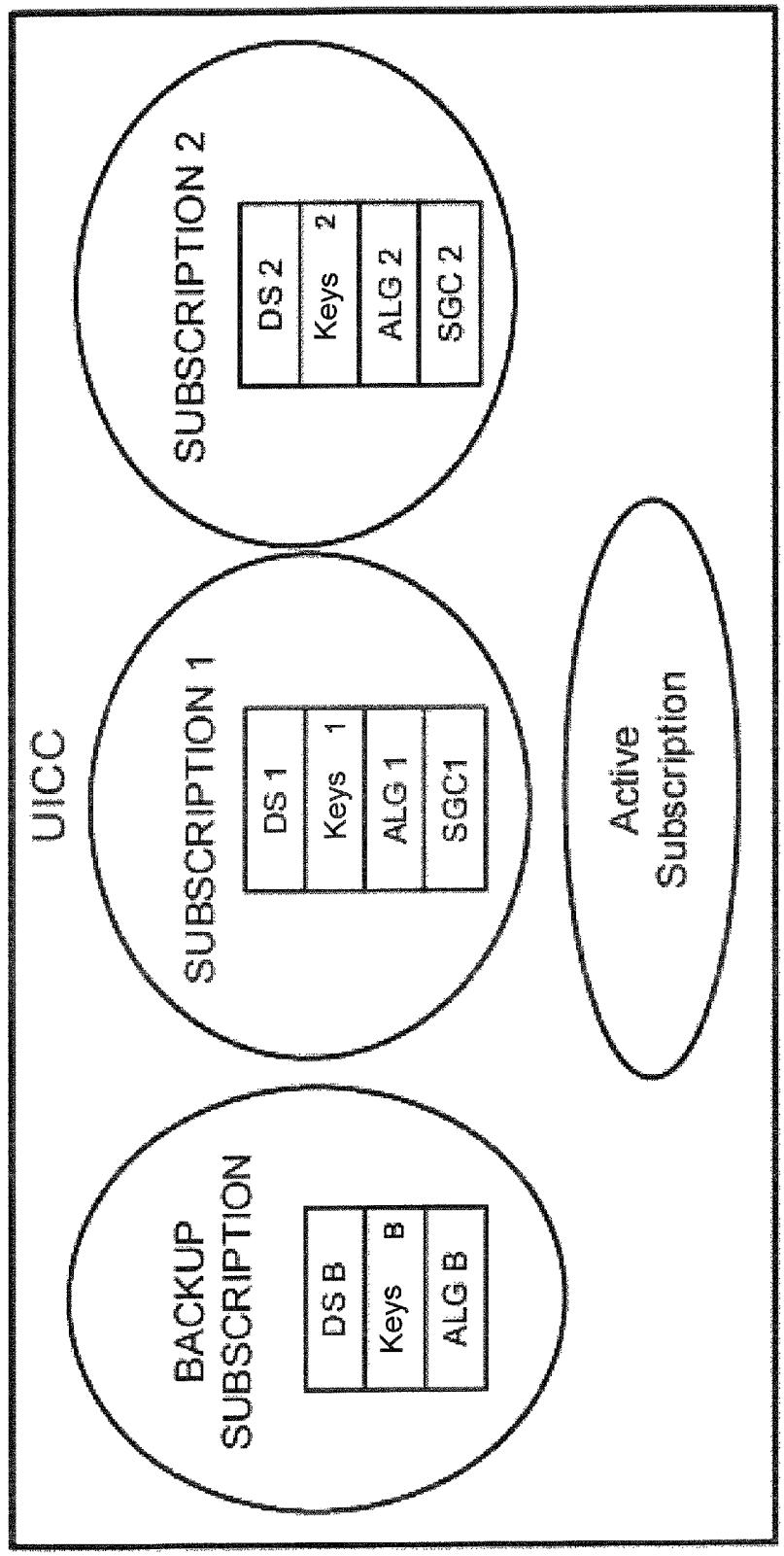
FIG. 5 shows a diagram of the data structure of a UICC involved in the present invention.

FIG. 5 shows the content of the UICC which comprises:
Active subscription: used by the connected device for network authentication.
Backup subscription: Subscription which can be recovered when it is required. It contains:
DS B—Backup subscription data.
Keys B—Backup keys.
ALG B—Backup key-generating algorithm.
Subscription 1 and 2—temporary subscriptions which can remotely be provisioned and which allow generating definitive subscriptions. They contain:
DS 1 or 2—Subscription data.
Keys 1 or 2—Authentication keys.
ALG 1 or 2—Key-generating algorithms.
SGC 1 or 2—Key-generating seeds.
Key-generating seed:
allows generating new authentication keys in the operator network and in the UICC from keys known at both ends.
the new keys are the result of applying the old keys, a cryptographic algorithm known at both ends using the key-generating seed as input data.
The nature of the key-generating seed depends on the cryptographic algorithm used for generating the new keys. Examples of key-generating seeds which can be used are:
An initialization vector if the cryptographic algorithm for key generation was based on symmetric cryptography.
Random bits (or salt) if the cryptographic algorithm for key generation was based on key derivation functions.
Any other alternative cryptography previously agreed on at both ends.

Figure 6:
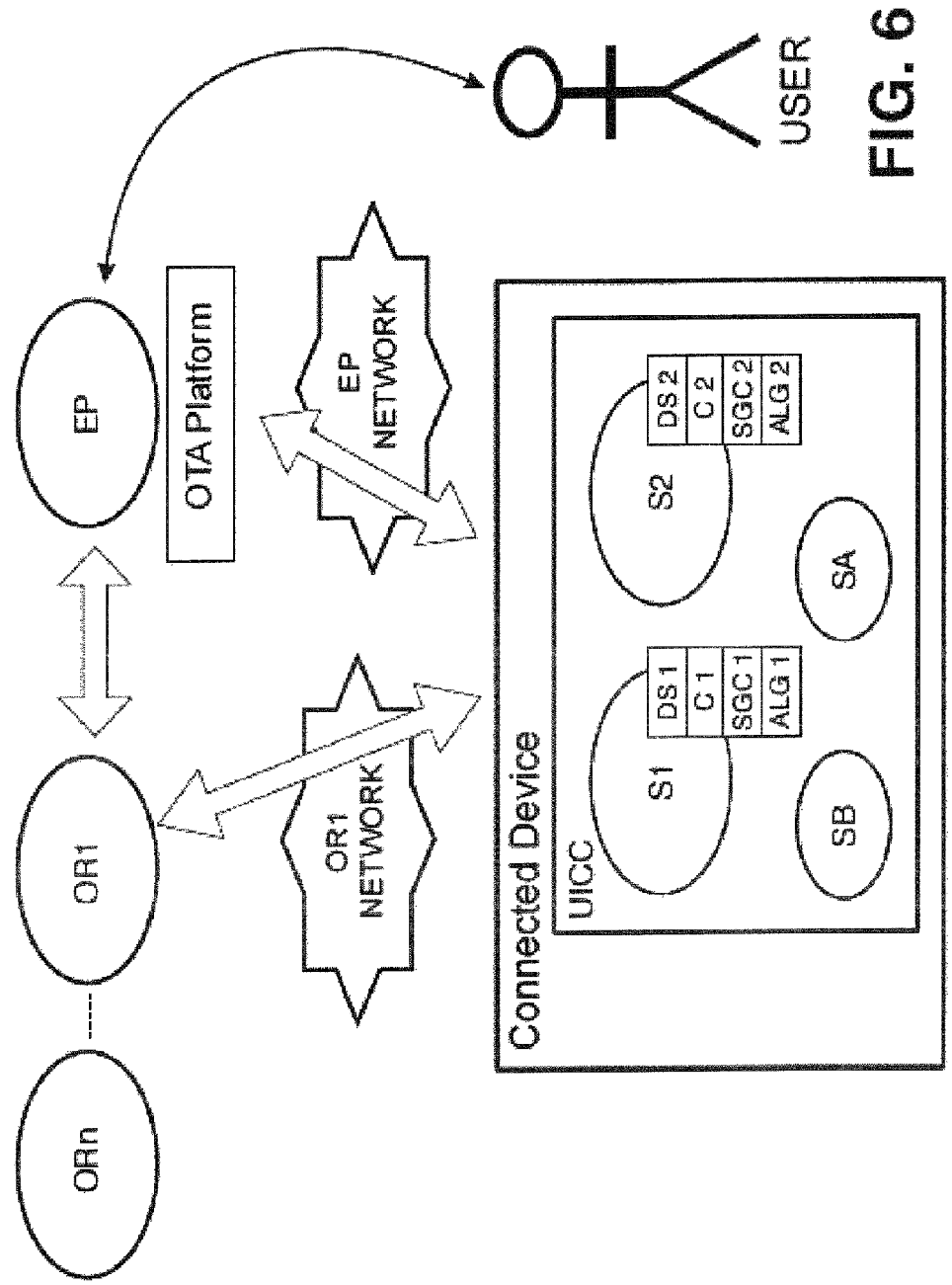
FIG. 6 shows a diagram of a remote subscription provisioning process according to a preferred embodiment of the present invention.

FIG. 6 shows a preferred embodiment of the invention (method 1), corresponding to the case of the first use of the handset as soon as it is purchased, comprising the following phases:
The user acquires the connected device with the following features:
UICC containing data, including the initial keys keys 1 (C1), defining an initial subscription of the pre-provisioning entity (EP) as the first temporary subscription (S1) and as the active subscription (SA).
The user signs up to a connectivity service with a first network operator (OR1) through the pre-provisioning entity (EP).
The (EP) requests the service from the (OR1) for the user, requesting new: subscription data (DSn), key-generating seed (SGCn) and key-generating identifier (ALGn). Furthermore, the (EP) delivers the initial keys keys 1 (C1) which are currently in use in the UICC to (OR1), which keys are known since the subscription existing in the UICC is the subscription of (EP) itself.
At this time the (OR1) creates a new temporary subscription (Sn) in which new (DSn), (SGCn) and (ALGn) are generated, and establishes the result of applying a key-generating algorithm on the initial keys keys 1 (C1) received from the (EP) using the key-generating seed (SGCn), as the new keys (n).
The (OR1) delivers the new (DSn), (SGCn) and (ALGn) generated for the new temporary subscription (Sn) to (EP).

(EP) sends (through its own network) the new (DSn), (SGCn) and (ALGn) to the UICC by means of its OTA platform.
The UICC stores the data of the first temporary subscription (S1) in the backup subscription (SB).
The UICC stores the new parameters received (DSn), (SGCn) and (ALGn) as data (DS2), (SGC2) and (ALG2) of a second temporary subscription (S2) it has and establishes:
DS 2=DSn received.
SGC 2=SGCn received.
ALG 2=ALGn received.
The UICC calculates keys 2 as the result of applying the aforementioned key-generating algorithm on the initial keys keys 1 (contained in S1) and using SGC2, i.e., the SGCn received, as the seed. Keys 2 calculated by the UICC will coincide with the new keys$_n$ which have been generated by (OR 1), keys 2=keys$_n$, therefore the first operator (OR1) and the UICC now have the definitive keys allowing the access of the UICC and therefore of the owner or user thereof, to the communication services offered by the first operator (OR1).
The same key-generating algorithm is used to generate new keys both in the operator to whom subscription is requested, and in the UICC card, therefore said key-generating algorithm was already known for both entities or had been agreed upon previously. On the other hand, the key-generating algorithm (ALGn) makes use of the already generated keys for performing user authentication, i.e., card authentication, in the communication network.
The definitive keys of the definitive subscription to the operator (OR1) have thus been generated in both entities: the operator (OR1) and the UICC, without the need of these definitive keys having been transmitted, and therefore preventing fraudulent access to same.
The UICC then establishes (S2) as the new active subscription (SAn).
The UICC resets the connected device to perform a new authentication with respect to (OR 1) using the new active subscription (SAn), which must be possible since (OR 1) and the device share the same keys at that time.
If the authentication process is satisfactory, the connected device will be authenticated correctly in the (OR1) network.
If authentication is not possible the UICC would reestablish the backup subscription (SB), where (S1) has previously been saved, as (SA) to prevent the device from going offline which would make subsequent provisioning impossible.

Figure 7:
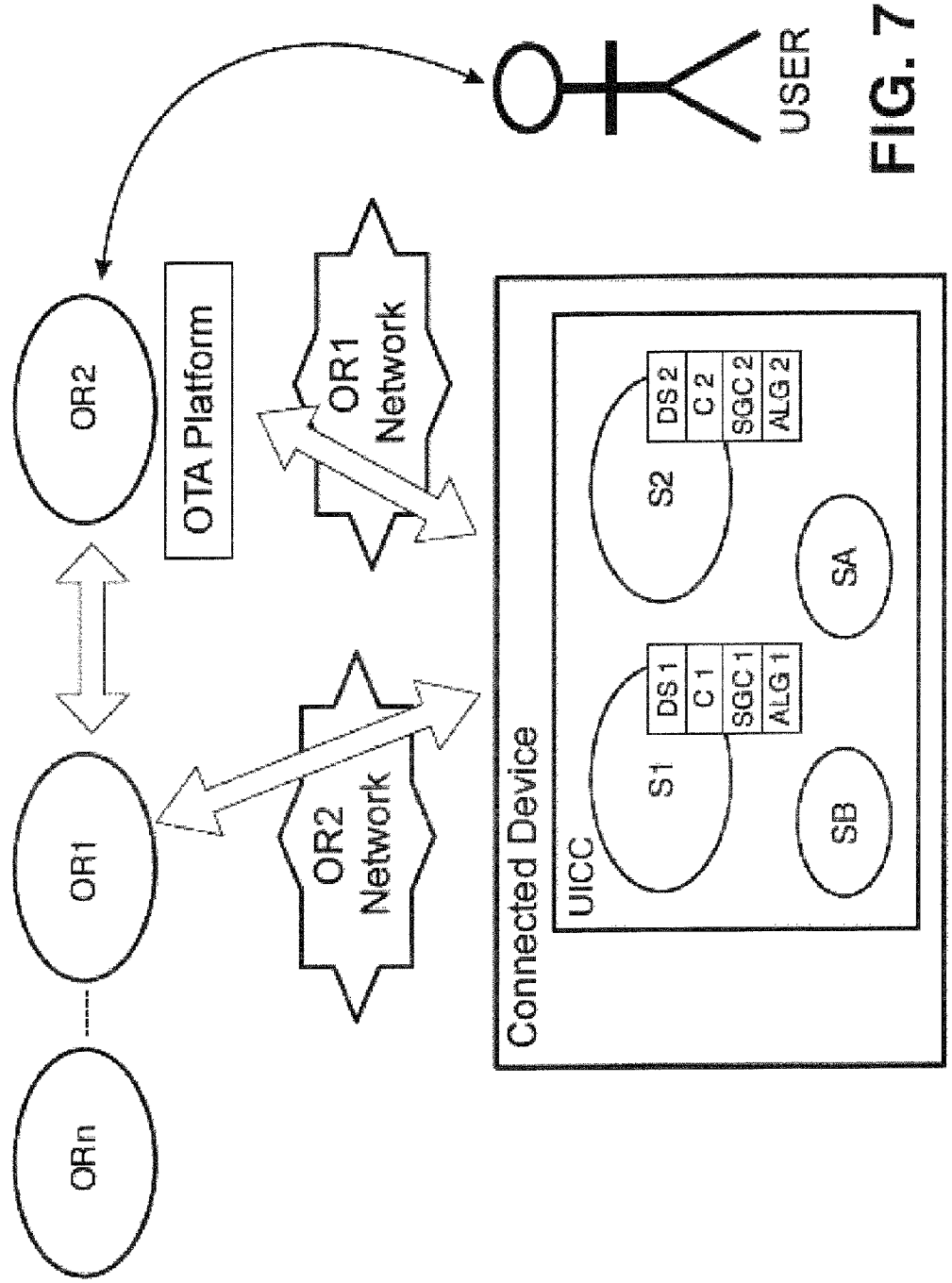
FIG. 7 shows a diagram of a remote subscription provisioning process according to another preferred embodiment of the invention.

FIG. 7 shows another preferred embodiment of the invention (method 2), corresponding to the case of a change of operator (portability), comprising the following phases:
The user acquires the connected device with the following features:
UICC containing data, including an initial keys keys 1 (C1), defining an initial subscription of a second network operator (OR2) as the first temporary subscription (S 1) and as the active subscription (SA).
The user signs up to the connectivity service with a first network operator (OR1) through the (OR2).

The (OR2) requests the service from the (OR1) for the user, requesting new (DSn), (SGCn) and (ALGn) and delivers the initial keys keys 1 (C1) which are currently in use in the UICC.

At this time the (OR1) creates a new temporary subscription (Sn) in which the new (DSn), (SGCn) and the key-generating algorithm (ALGn) are generated and the result of applying a key-generating algorithm on the initial keys keys 1 received from the (OR2) using the key-generating seed (SGCn) are established as new keys$_n$.

The (OR1) delivers the new (DSn), (SGCn) and (ALGn) generated for the new temporary subscription to the (OR2).

The (OR2) sends the new (DSn), (SGCn) and (ALGn) (through its own network) to the UICC by means of its OTA platform.

The UICC stores the data of (S1) in the backup subscription (SB).

The UICC stores the new parameters received (DSn), (SGCn) and (ALGn) as data (DS2), (SGC2) and (ALG2) of a second temporary subscription (S2) it has and establishes:
DS 2=DSn received.
SGC 2=SGCn received.
ALG 2=ALGn received.

The UICC calculates keys 2 as the result of applying the same key-generating algorithm on the initial keys keys 1 contained in (S1) and using SGC 2, i.e., the SGCn received, as the seed. Keys 2 calculated by the UICC will coincide with the new keys$_n$ which the (OR2) had generated, keys 2=keys$_n$, therefore the (OR2) and the UICC now have the definitive keys without needing them to have been transmitted.

The UICC establishes (S2) as (SA).

The UICC resets the connected device to perform a new authentication using the new active subscription (SAn), which must be possible since the (OR1) and the device share the same keys at that time.

If the process is satisfactory the connected device will be authenticated correctly in the (OR1) network.

If authentication is not possible the UICC would reestablish the backup subscription (SB), where (S1) has previously been saved, as (SA), to prevent the device from going offline which would make subsequent provisioning impossible.

Figure 8:
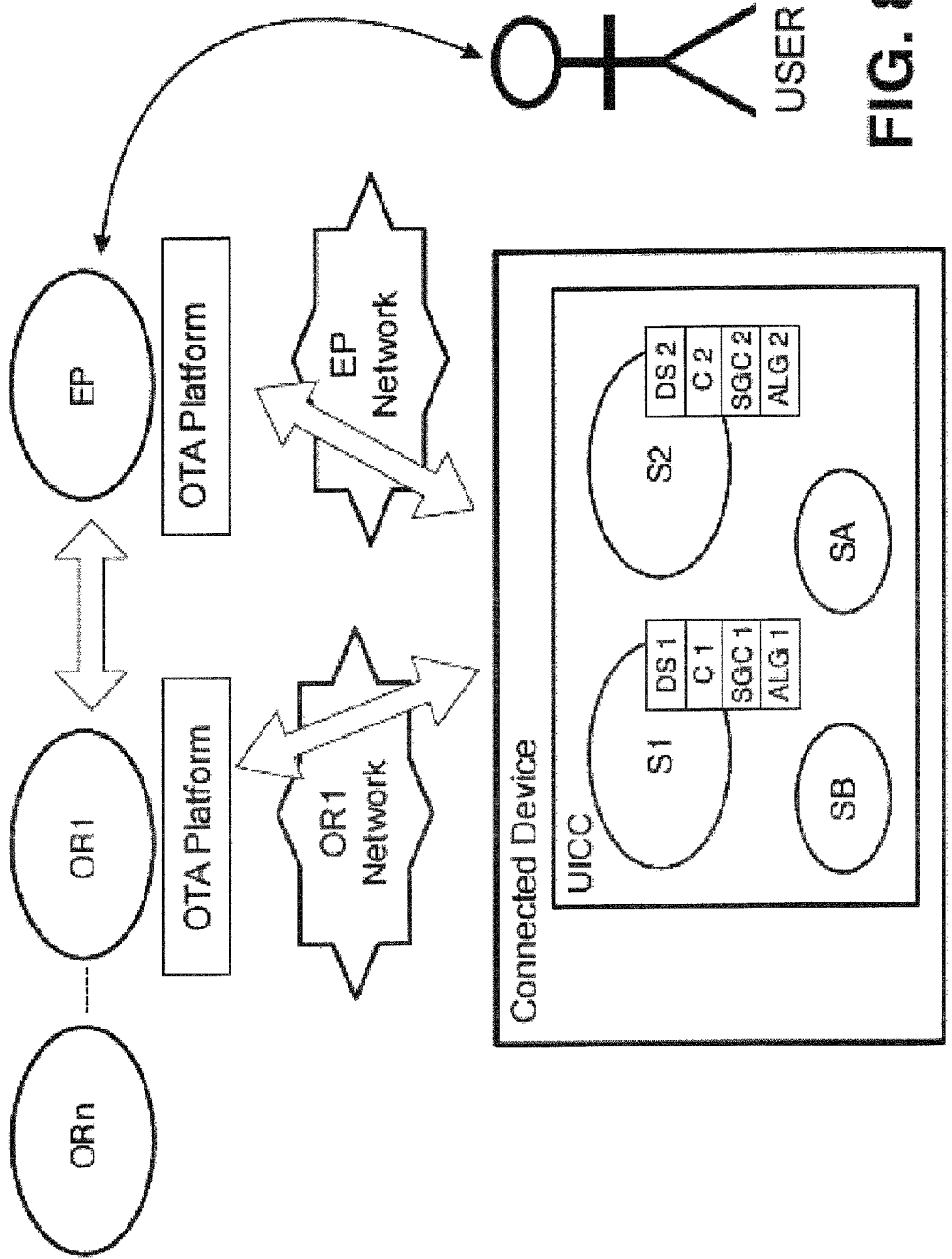
FIG. 8 shows a diagram of a remote subscription provisioning process according to another preferred embodiment of the invention.

FIG. 8 shows another preferred embodiment of the invention (method 3), comprising the following phases:

The user acquires the connected device with the following features:
  UICC containing data, including an initial keys keys 1 (C1), defining an initial subscription of the pre-provisioning entity (EP) as the first temporary subscription (S1) and as the active subscription (SA).

The user signs up to a connectivity service with a first network operator (OR1) through (EP).

The (EP) requests the service from the (OR1) for the user, requesting the new (DSn). The (EP) further sends the initial keys keys 1 which are currently in use in the UICC to the (OR1).

At this time the (OR1) creates a new temporary subscription (Sn) in which new (DSn), (SGCn) and (ALGn) are generated and the initial keys keys 1 received by (EP), keys, =keys 1, are established as temporary keys keys. Unlike methods 1 and 2 of FIGS. 6 and 7 definitive keys are not calculated in this phase of the process.

The (OR1) delivers the new (DSn) and (ALGn) generated for the new subscription to the (EP), but it does not send the key-generating seed (SGCn) to the (EP).

The (EP) sends (through its own network) the new (DSn) and (ALGn) to the UICC by means of its OTA platform.

The UICC stores the data of (S1) in the backup subscription (SB).

The UICC stores the new parameters received (DSn) and (ALGn) in a second temporary subscription (S2) it has and establishes:
DS 2=DSn received.
SGC 2=is left empty.
ALG 2=ALGn received.

The UICC establishes the keys 1 contained in (S1), i.e., the keys which the UICC already had, as keys of the second temporary subscription (S2), keys 2=keys 1, which in turn coincide with the temporary keys keys$_t$. The UICC establishes (S2) as the new active subscription (SAn).

The UICC resets the connected device to perform a new authentication with respect to (OR1) using the new active subscription (San), which is possible since both entities share key 1.

If the process is satisfactory the connected device will be authenticated correctly in the (OR 1) network.

If authentication is not possible, the UICC would reestablish (SB) as (SA) to prevent the device from going offline which would make subsequent provisioning impossible.

If the process is correct, the (OR1) sends the new parameter (SGCn) generated for the temporary subscription to the UICC, through its own OTA platform, i.e., directly without involving another entity. The criterion of Operator (OR1) for generating the (SGCn) can be, for example, a random number. At this time the communication is direct between operator (OR 1) and the user device without the need of having a third entity, such as for example the (EP).

The UICC stores the new parameters in the first temporary subscription (S1) establishing:
DS 1n=DS 2 (already available in S2).
SGC 1n=SGCn received.
ALG 1n=ALG 2 (already available in S2).

The UICC establishes keys 1n as the definitive keys for the first temporary subscription, the result of applying a key-generating algorithm on the keys (contained in S2)=keys 1 using the new (SGC 1n) as the seed.

The UICC establishes (S1) as (SA).

The (OR1) establishes the result of applying the same key-generating algorithm on keys 1 using the new (SGC 1n) as the seed, as the definitive keys keys 1n.

The UICC resets the connected device to perform a new authentication with respect to (OR1) using the new SA.

If the process was satisfactory the connected device will be authenticated correctly in (OR 1) network.

If authentication is not possible, the UICC would reestablish either (SB) or (S2) as (SA) to prevent the device from going offline which would make subsequent provisioning impossible.

The advantage of method 3 with respect to method 1 of FIG. 6 is that now the seed does not pass through the (EP) at all, therefore it is not possible to obtain the new keys by attacking the (EP). In method 1 of FIG. 6, the (EP) even had the old keys and the seed (or they at least pass through it), therefore the new keys could be calculated if a non-reliable (EP) or the key-generating algorithm used in the UICC and in (OR1) is known (although it should not be so). However, with method 3 of FIG. 8, that possibility is prevented.

Figure 9:
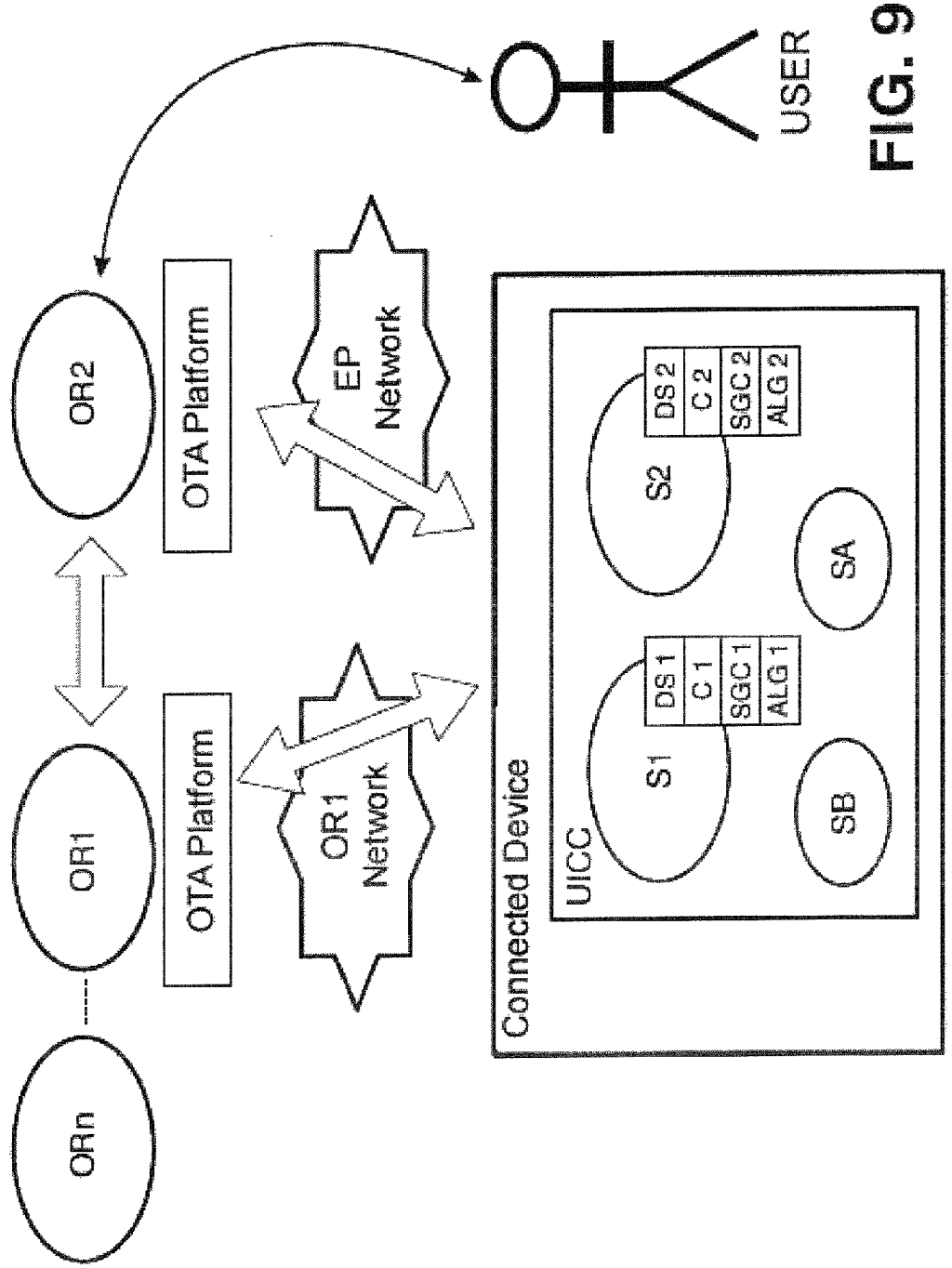
FIG. 9 shows a diagram of a remote subscription provisioning process according to another preferred embodiment of the invention.

FIG. 9 shows another preferred embodiment of the invention (method 4), comprising the following phases:

The user acquires the connected device with the following features:
  UICC containing data of an initial subscription of a second network operator (OR2) as the first subscription (S1) and as the active subscription (SA).

The user signs up to the connectivity service with a first network operator (OR1) through (OR2).

The (OR2) requests the service from the (OR1) for the user, requesting new (DSn). Furthermore, (OR2) delivers keys 1 which are currently in use in the UICC to (OR1).

At this time the (OR1) creates a new subscription (Sn) in which the new (DSn), (SGCn) and (ALGn) (algorithm identifier) are generated and the keys received by the (OR2) are established as temporary keys keys$_t$. keys t=keys 1. Unlike methods 1 and 2 of FIGS. 6 and 7 new keys are not calculated in this phase of the process.

The (OR1) delivers the new (DSn) and (ALGn) generated for the new temporary subscription to (OR2), but it does not send the new seed (SGCn) to the (EP).

The (OR2) sends (through its own network) the new (DSn) and (ALGn) to the UICC by means of its OTA platform.

The UICC stores the data of (S1) in the backup subscription (SB).

The UICC stores the new parameters received (DSn) and (ALGn) in the second temporary subscription (S2) and establishes:
  DS 2=DSn received.
  SGC 2=is left empty.
  ALG 2=ALGn received.
  The UICC establishes the keys contained in (S1), i.e., keys 2=keys 1, i.e., the keys which the UICC already had as the keys of the second temporary subscription (S2).

The UICC establishes (S2) as (SA).

The UICC resets the connected device to perform a new authentication using the new active subscription (SAn).

If the process was satisfactory the connected device will be authenticated correctly in the operator network (OR1) from which subscription is requested.

If authentication is not possible the UICC would reestablish (SB) as (SA) to prevent the device from going offline which would make subsequent provisioning impossible.

If the process is correct, the (OR1) sends the new seed (SGCn) generated for the temporary subscription through its own OTA platform directly to the UICC.

The (OR1) converts the temporary subscription into definitive subscription establishing new keys as the result of applying the key-generating algorithm to the temporary keys$_t$ using the new seed (SGCn) as the seed.

The UICC establishes (S1) as (SA).

The UICC stores the new parameters in (S1):
  DS 1*n*=DS 2 (already available in S2).
  SGC 1*n*=SGCn received.
  ALG 1*n*=ALG 2 (already available in S2).
  The UICC establishes, the result of applying the same key-generating algorithm on keys 2 (contained in S2)=keys 1 using the new SGCn as the seed, as the definitive keys keys 1*n* for the first temporary subscription.

The UICC establishes (S1) as (SA).

The UICC resets the connected device to perform a new authentication using the new active subscription (San).

If the process is satisfactory the connected device will be authenticated correctly in the (OR2) network.

If authentication is not possible the UICC would reestablish either (SB) or (S2) as (SA) to prevent the device from going offline which would make subsequent provisioning impossible.

What is claimed is:

1. Method for the remote provisioning of an access subscription of a user to a wireless communication network, wherein at least one network operator provides communication services to mobile communication devices provided with a user UICC card, wherein said UICC card is preloaded with data defining an initial active subscription, said data comprising initial keys,
   wherein the method comprises,
   receiving a subscription provisioning request by a first network operator sent from the UICC card;
   receiving the initial keys forming part of said initial active subscription at said first network operator;
   generating data of a new temporary subscription in the first network operator and sending at least part of the data of the new temporary subscription that is generated by the first network operator to the UICC card;
   generating the definitive keys of a definitive subscription from the data of the new temporary subscription sent to the UICC card and the initial keys in the first network operator and in the UICC card,
   wherein said definitive subscription is valid for the access of the UICC card to the services provided by the first network operator.

2. Method according to claim 1, wherein the sending of a subscription provisioning request to the first network operator, and at least part of the sending of data between the UICC card and the first network operator for the remote provisioning of the subscription, is performed through a pre-provisioning entity or through a second network operator.

3. Method according to claim 2, wherein said UICC contains data defining an initial subscription for authentication in the pre-provisioning entity or in the second network operator.

4. Method according to claim 1, wherein the data defining the new subscription comprise: data of the first operator to identify the subscription, a new seed and an algorithm identifier for performing user authentication in the first operator.

5. Method according to claim 1, wherein the data of the new subscription generated by the first operator comprise new subscription data and an algorithm identifier.

6. Method according to claim 5, wherein the data of the new subscription further comprise a new key-generating seed.

7. Method according to claim 4, wherein the definitive keys of the definitive subscription are generated in the first network operator and in the UICC card from a key-generating algorithm and the initial keys keys 1 using the new key-generating seed.

8. Method according to claim 5, wherein after the sending of the new subscription data and the algorithm identifier from the first operator to the UICC card, an authentication between the first operator and the UICC card is performed using initial keys that they share, such that if the authentication process is successful, direct communication is established between the first operator and the UICC card to complete the subscription provisioning process.

9. Method according to claim 4, wherein after the favorable authentication between the first operator and the UICC card, the first operator sends the new key-generating seed directly to the UICC, and definitive keys, which are obtained from the key-generating algorithm and the initial keys and by using the new key-generating seed, are generated in the first operator and in the UICC card.

10. Method according to claim 1, wherein the wireless communication network is at least a mobile telephony network having one or more operators.

11. UICC card configured for implementing the method defined in claim 1.

12. Wireless communication device incorporating a UICC card defined in claim 11.

13. Device according to claim 12 consisting of a mobile handset.

14. Wireless communication network operating at least in part according to the method defined in claim 1.

15. Method according to claim 1, wherein the UICC card is pre-loaded with data defining the initial active subscription at least prior to receiving a subscription provisioning request by the first network operator.

16. Method according to claim 15, wherein the UICC card is pre-loaded at a factory.

* * * * *